United States Patent
Momii et al.

[11] Patent Number: 6,052,665
[45] Date of Patent: *Apr. 18, 2000

[54] SPEECH INPUT TERMINAL AND SPEECH SYNTHESIZING TERMINAL FOR TELEVISION CONFERENCE SYSTEM

[75] Inventors: Akinori Momii; Makoto Hasegawa; Seiichi Kakinuma; Masakatsu Fujita, all of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,649

[22] Filed: Jun. 25, 1996

[30] Foreign Application Priority Data

Nov. 22, 1995 [JP] Japan .................................. 7-304287

[51] Int. Cl.[7] ...................................................... G10L 5/00
[52] U.S. Cl. .............................. 704/270; 381/107; 348/15
[58] Field of Search .................................... 395/2.09, 2.1, 395/2.6, 2.68, 2.79, 2.83, 2.84; 348/15; 200/34; 704/270, 275; 381/109, 107

[56] References Cited

U.S. PATENT DOCUMENTS

| | | | |
|---|---|---|---|
| 4,707,858 | 11/1987 | Fette | 395/2.6 |
| 4,710,917 | 12/1987 | Tompkins et al. | 395/200.34 |
| 4,827,518 | 5/1989 | Feustel et al. | 395/2.55 |
| 5,046,107 | 9/1991 | Iwamatsu | 381/107 |
| 5,436,582 | 7/1995 | Ikeda | 438/9 |
| 5,615,256 | 3/1997 | Yamashita | 379/390 |

*Primary Examiner*—Emanuel Todd Voeltz
*Assistant Examiner*—M. David Sofocleous
*Attorney, Agent, or Firm*—Helfgott & Karas, PC.

[57] ABSTRACT

Transmission level control is provided to eliminate a sense of disorder during a television conference connecting a multiplicity of locations.

In a speech input terminal included in connection between multiple locations, there is provided a speech input means for inputting speech, a communication control means for controlling communication between the speech input means and a communication line, a transmission volume adjusting means capable of stepless adjustment of transmission volume, and a reception volume adjusting means. Thus, the volume adjusting means which has conventionally been provided only at a receiving end is now provided also at a transmitting end to allow stepless volume control, which enables speech output in conformity with the speech level of another entity's terminal.

11 Claims, 8 Drawing Sheets

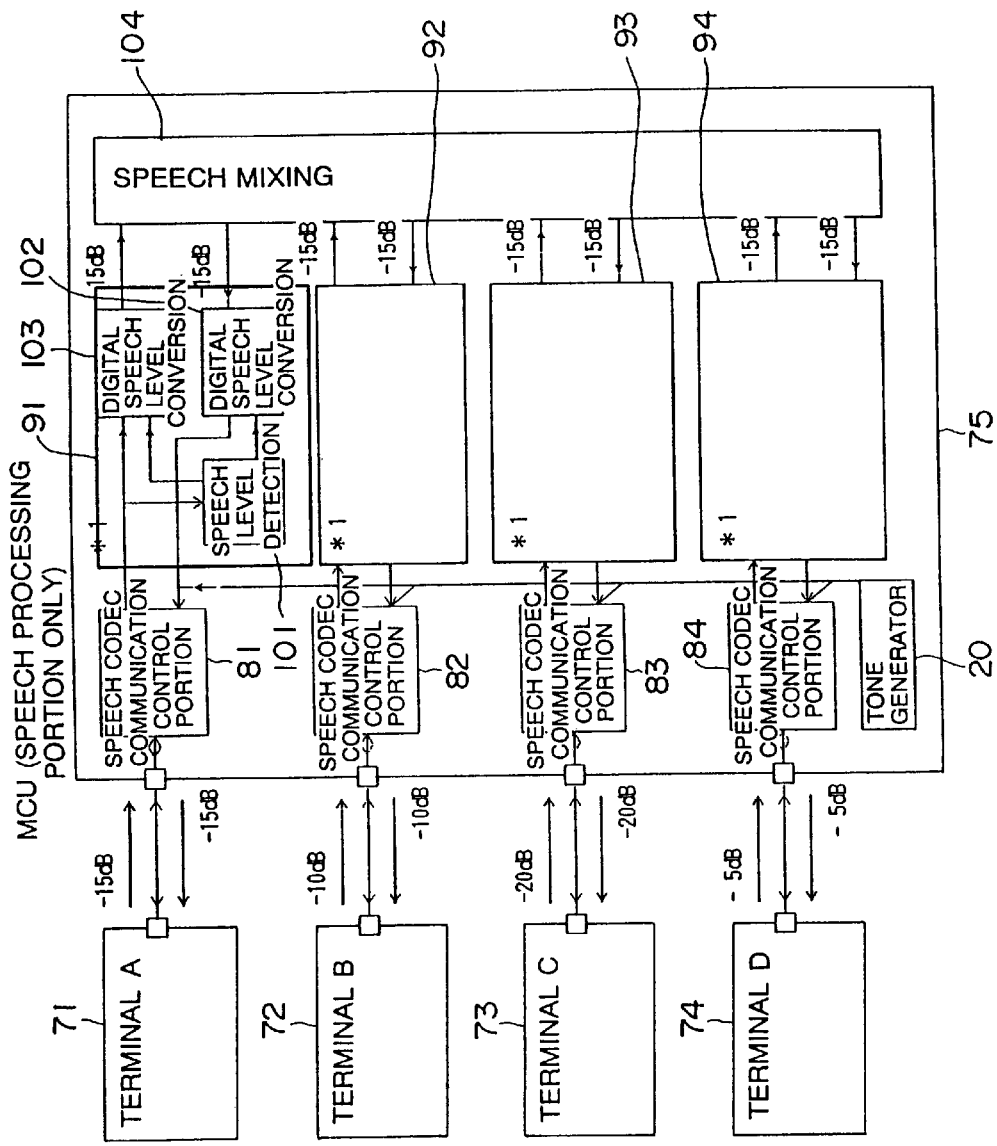

SPEECH INPUT TERMINAL AND SPEECH SYNTHESIZING TERMINAL FOR TELEVISION CONFERENCE SYSTEM

BACKGROUND OF THE INVENTION

1. Field of the Invention

The present invention relates to a technique which is effectively applied to a television conference system operating between a multiplicity of locations.

2. Description of the Related Art

Early television conference systems were primarily used as an expanded version of common television telephone systems which allow a plurality of members meeting at a conference room in each of two locations to hold a conference.

However, it is expected that the advent of smaller and less expensive television conference apparatuses will direct the mainstream toward systems wherein a small number of attendants will hold a television conference between three or more locations by connecting with each other's terminals.

Needless to say, it is expected that when such television conferences become popular, conferences will be held between a multiplicity of locations by connecting terminals from different manufacturers or by connecting new and old terminals of the same manufacturer with each other.

When different types of terminals at a multiplicity of locations are connected to each other as described above, since the transmission level of speech information varies depending on the type of terminal, speech from a terminal having a higher transmission level is delivered to all other terminals in a louder voice, and speech from a terminal having a lower transmission level is delivered to all other terminals in a softer voice. This has resulted in the possibility that the initiative for holding a conference may be determined by the transmission levels of the terminals.

In an early opposed-type television conference system operating between two locations, even if there is a difference in the speech levels of the two terminals, a sense of disorder caused by such can be reduced by adjusting the volume of the speaker outputs. However, in the case of connection between a multiplicity of locations wherein three or more locations are connected, reducing the volume of the speakers to adjust to a louder speech level makes speech from a terminal of a softer speech level indistinct and, conversely, adjusting the volume for a softer speech level excessively increases the volume from a terminal of speech of a louder speech level. This has led to deterioration of speech quality and uncomfortableness.

The present invention has been conceived taking the above-described points into consideration, and there is provided a television conference system in which an action taken at one entity's terminal or at a speech synthesizing terminal allows speech to be produced without causing a sense of disorder regardless of the characteristics of other entity terminals in communication.

SUMMARY OF THE INVENTION

According to the present invention, a speech input terminal in connection with a multiplicity of locations is provided with a speech input means for inputting speech, a communication control means for controlling communication between the speech input means and a communication line, a transmission volume adjusting means capable of performing stepless adjustment of transmission volume, and a reception volume adjusting means.

Stepless volume control can be performed at a transmission end by providing it with a volume adjusting means which has conventionally been provided only at a receiving end. As a result, speech can be output from one terminal in conformity with the speech level of other entity terminals.

There is provided a second means which is a volume adjustment control means for adjusting the above-described transmission volume adjusting means based on information about another entity's terminal.

For example, the transmission volume control means can be controlled in accordance with the information about a plurality of other entity terminals to which communication is to be made by inputting such information in advance into a memory of one entity's speech input terminal. Specifically, when it is known that the speech output level of the entity's speech output terminal is −20 dB, and that the other entity's terminal speech output level is −10 dB, the volume adjustment control means controls the transmission volume adjusting means by a control amount of +10 dB.

When there is provided two or more speech input means such as microphones at a speech input terminal, a selection means (selector) is provided as a third means between these speech input means and the transmission volume adjusting means, and the transmission volume control means is instructed to adjust the speech output of the one speech input means that is selected by the selection means.

This makes it possible to output a speech signal to other entity terminals after adjusting it to a predetermined transmission level, even if there are other, different transmission levels that depend on the characteristics of the microphones.

As a fourth means, there is provided a reference signal generation means between the speech input means and the transmission volume adjusting means for transmitting a reference signal from another entity's terminal, and a reception level detecting means for detecting the reception level of a reception signal looped back therefrom. A level difference between the transmitted reference signal and the reception signal is detected and output from the volume adjustment control means to each volume control means as a control amount.

For example, the reference signal generation means may be a tone generator which is capable of detecting a level difference between one entity's terminal and another entity's terminal based on a tone signal looped back from the latter. The difference can be provided to the volume adjusting means to enable a speech signal at a level that does not cause a sense of disorder to be transmitted to the other entity's terminal.

In the case of a speech synthesizing terminal connected to a plurality of speech input terminals, there is provided, as a fifth means, a reference signal generation means for generating a reference signal for each of the speech input terminals and a speech level detecting means for detecting the level of a reception signal looped back from each speech input terminal. The speech level obtained by the speech level detecting means is compared with a reference level of one entity's terminal and is adjusted to the reference level by an input level conversion means using the difference thereof as a correction amount. Then, speech signals from each speech input terminal are synthesized by a speech synthesizing means at this reference level, and this synthesized speech signal is output to another entity's terminal after being re-converted into the speech level of the other entity's terminal by the input level conversion means.

As described above, an exclusive terminal for speech synthesizing is provided in addition to speech output terminals to adjust the speech level of each of the speech output terminals. This makes it possible to adjust the speech level of a television conference system as a whole without performing any action on any speech output terminal, and to thereby hold television conference which causes no sense of disorder at any of the connected locations.

As a sixth means, a training sequence is executed, before conversation is started between speech input terminals, wherein the above-described reference signal is transmitted to detect the speech level of each speech input terminal. A switching means is provided at the speech synthesizing terminal to enable switching of the output thereof between this reference signal and normal synthesized speech signals.

The speech synthesizing terminal executes the training sequence before a television conference is started. Specifically, the speech synthesizing terminal issues an analog loopback request to each speech output terminal, transmits the reference signal (tone signal) by placing the switching means in a position to output the reference signal, and compares a feedback reference signal returned by each speech output terminal with the transmitted reference signal. This makes it possible to easily detect the speech level of each speech output terminal.

BRIEF DESCRIPTION OF THE DRAWINGS

FIG. 8 is a block diagram showing internal functions of a signal synthesis controller of the third embodiment of the invention.

DETAILED DESCRIPTION OF THE PREFERRED EMBODIMENTS

Preferred embodiments of the present invention will now be described with reference to the drawings.

A first embodiment will be described.

Figure 1:
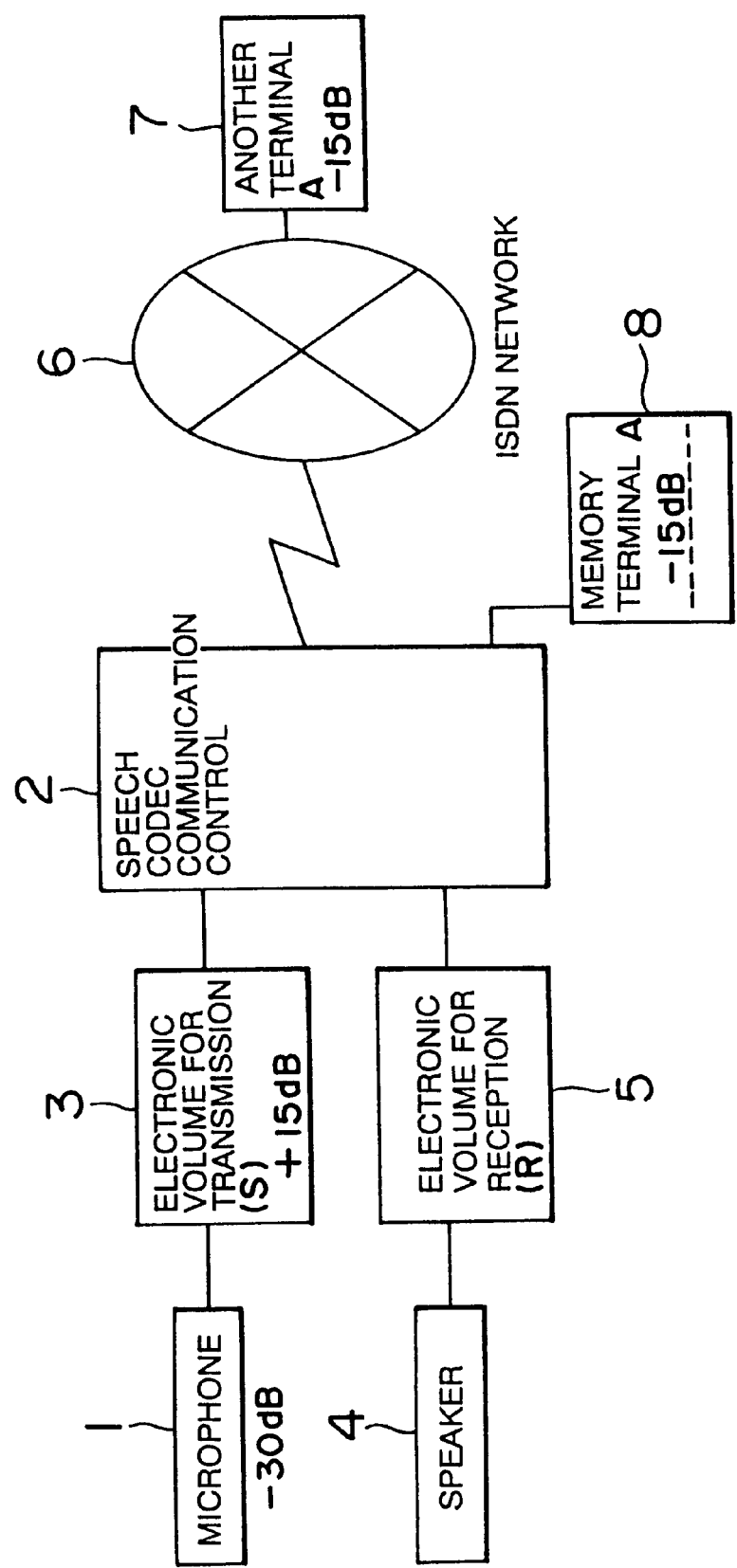
FIG. 1 shows a system configuration of a first embodiment of the present invention.

In order to briefly describe the principle of the present invention, a description will be made of an example of connection between two locations wherein one entity's terminal is connected to another entity's terminal 7 through a communication network. FIG. 1 shows the function of only speech processing in a television conference system.

As illustrated in FIG. 1 as a basic configuration, an electronic volume 3 for transmission is provided as a transmission volume adjusting means between a speech CODEC communication control portion 2 (communication control means) and a microphone 1 (speech input means).

The speech CODEC communication control portion 2 includes a memory 8 in which the speech output levels of other entity terminals connected thereto are registered as a database.

When a television conference is started, the speech CODEC communication control portion accesses the memory to read the data of the other entity's terminal 7 connected thereto through a network 6. It calculates the difference between the speech output levels of the one entity's terminal and the other entity's terminal 7 and sets this difference in the electronic volume 3 for transmission.

Specifically, as shown in FIG. 1, the speech transmission level of the microphone 1 of the one entity terminal is −30 dB, and the speech transmission level of the other entity's terminal 7 is −15 dB. Therefore, the difference +15 dB therebetween is set in the electronic volume 3 for transmission.

As a result of this adjustment of the electronic volume 3 for transmission, the speech output level transmitted by the one entity's terminal becomes −15 dB, which is equal to the transmission level of the other entity's terminal 7.

The speaker 4 is provided for listening to speech from the other entity's terminal 7, and the speech output thereof can be adjusted by an electronic volume 5 for reception.

Figure 2:
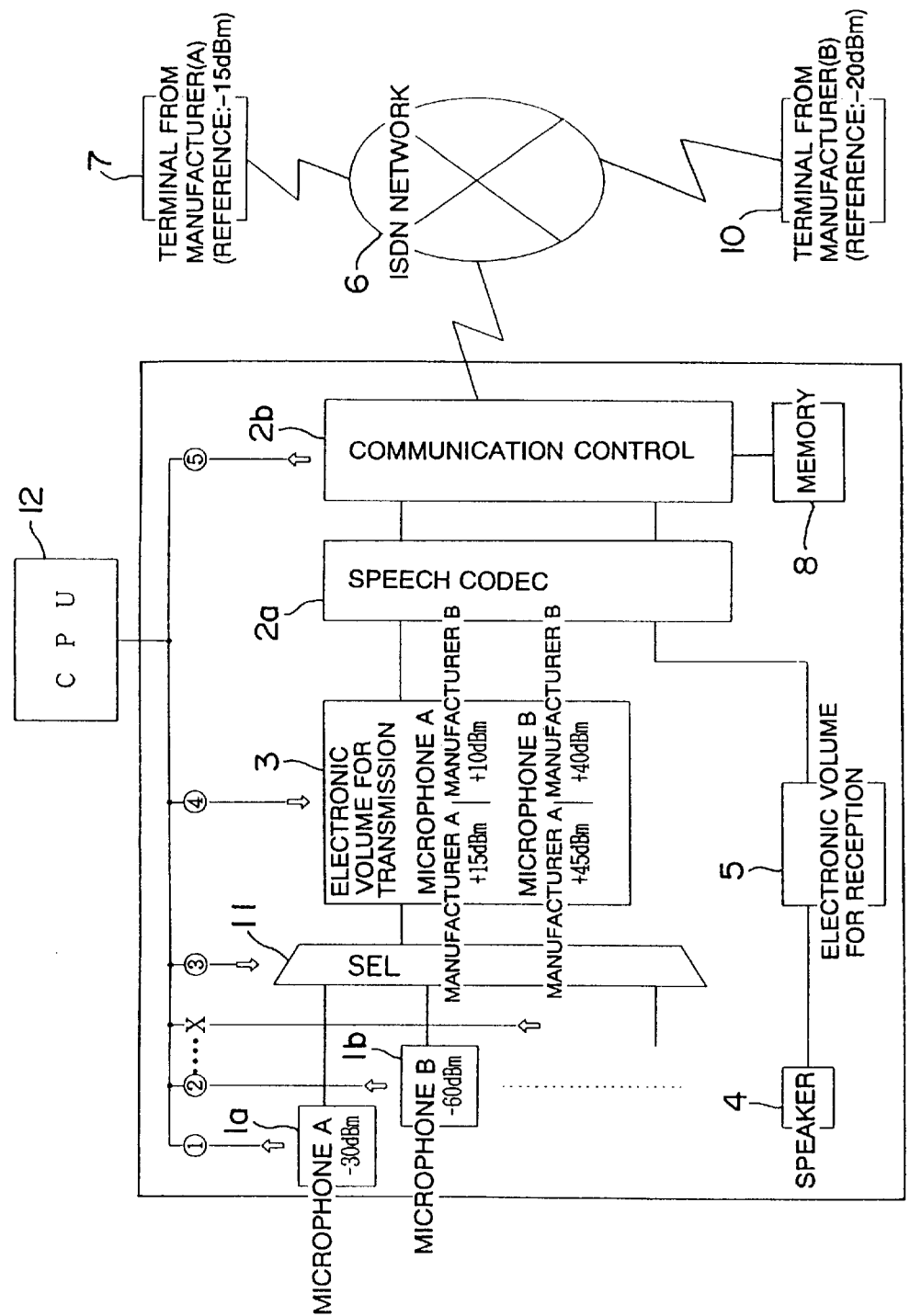
FIG. 2 is a block diagram showing internal functions of one entity's terminal of the first embodiment of the invention.

FIG. 2 shows a modification of the present embodiment wherein two or more microphones 1a, 1b, and so on, are provided at the one entity's terminal.

In FIG. 2, the microphone 1a is characterized by a transmission level of −30 dB, and the microphone 1b is characterized by a transmission level of −60 dB. A selector 11 (SEL) selectively switches the microphones 1a and 1b, and performs such a switching operation in accordance with instruction signals from a control portion 12 (CPU).

The electronic volume 3 for transmission includes a memory for storing an adjustment amount (correction amount) for each of the microphones 1a and 1b which depends on the transmission level of other entity terminals in communication.

A speech CODEC portion 2a manages the input and output of speech signals, modulates speech signals from the microphones 1a and 1b, and transfers them to a communication control portion 2b. The communication control portion 2b is an interface for communication with the external network 6 controlled by the control portion 12 (CPU). The communication control portion 2b includes a memory in which the speech output levels of other entity terminals connected thereto are stored as a database. In this case, a speech transmission reference level of 15 dB of another entity terminal 7 and a speech transmission level of −20 dB of still another entity terminal 10 are stored.

The speaker 4 is connected to the above-described speech CODEC 2a as a speech output means, and the output of the speaker 4 can be adjusted by the electronic volume 5 for reception on a stepless basis.

FIG. 2 shows an example wherein the other entity's terminal 7 having a speech transmission level of −15 dB and the yet another entity's terminal 10 having a speech transmission level of −20 dB are connected to the network 6 to enable a television conference to be held between four attendants in total; i.e., two at the one entity's terminal and one each at the other entity terminals 7 and 10.

In the present embodiment, the control portion (CPU) 12 first instructs the communication control portion 2b to read the data of the other entity terminals 7 and 10 (−15 dB and −20 dB) to which communication is to be established from the memory 8 thereof.

Upon receipt of the data through the communication control portion 2b, the control portion (CPU) 12 detects the level difference between each of the other entity terminals 7 and 10 and each of the microphones 1a and 1b, and sets the level differences in the electronic volume 3 for transmission as correction amounts. Specifically, the reference transmission level of the microphone 1a is −30 dB and, when a conversation is held with the another entity terminal 7 having a reference transmission level of −15 dB, there is a difference of +15 dB. Therefore, +15 dB is set as a first correction amount for the microphone 1a.

Similarly, when a conversation is held using the microphone 1a with the other entity terminal 10 having a reference transmission level of −20 dB, there is a difference of +10 dB. Therefore, +10 dB is set as a second correction amount for the microphone 1a.

Similarly, +45 dB and +40 dB are respectively set as first and second correction amounts for the microphone 1b.

When a television conference is started, the control portion (CPU) 12 monitors the state of switches of the microphones 1a and 1b ((1) and (2) in FIG. 2). The switch may be a mechanical speech switch provided at each microphone to enable speech using the same, or an electronic switch activated upon detection of speech input above a certain level using a very weak signal.

If speech using the microphone 1a or 1b is detected from the above-described switches, the selector 11 (SEL) selects the input from the microphone (e.g., microphone 1a) which has been granted the right to speak ((3) in FIG. 2).

Next, the control portion (CPU) 12 controls the electronic volume 3 for transmission based on the input from the microphone 1a selected as described above, and generates a speech signal at a transmission level of −15 dB to the other entity's terminal 7 and a speech signal at a transmission level of −20 dB to the yet another entity terminal 10 based on correction amounts calculated as described above.

By outputting a speech signal in conformity with the reference level of each of the other entity terminals 7 and 10 as described above, the television conference system as a whole enables a conversation which causes no sense of disorder.

Although the electronic volume 3 for transmission has been described as being automatically electronically controlled by the control portion (CPU) 12, it may be manually controlled by a speaker for fine adjustments.

Figure 3:
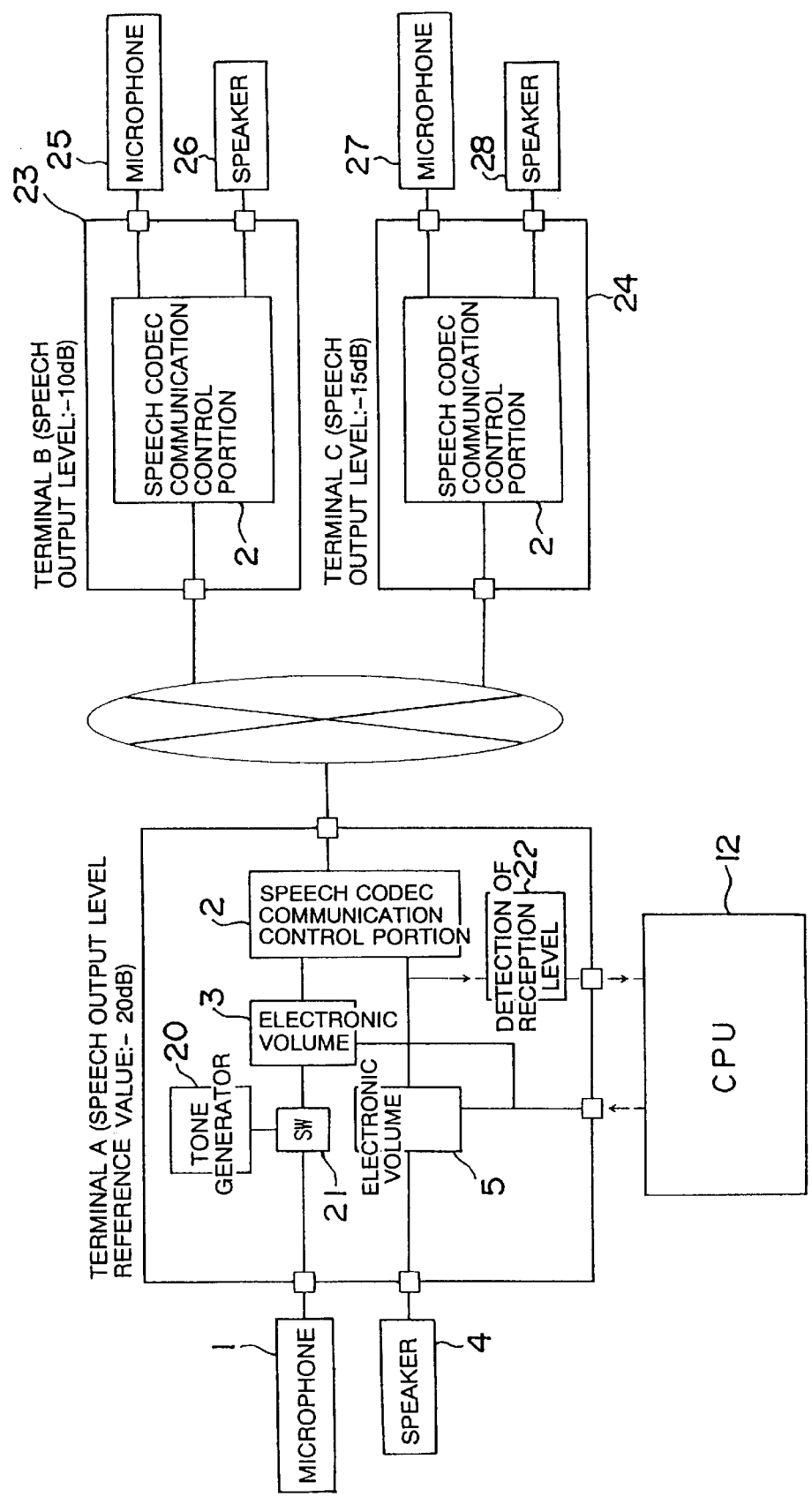
FIG. 3 shows a system configuration of a second embodiment of the present invention.

FIG. 3 shows another embodiment of the present invention. FIG. 3 shows an example of a television conference system connecting three locations wherein one entity's terminal and other entity terminals 23 and 24 are connected to a network 6.

Each of the terminals 23 and 24 includes a speech CODEC communication control portion 2, and microphones 25 and 27 as speech input means and speakers 26 and 28 as speech output means are externally connected to the terminals 23 and 24, respectively.

FIG. 3 shows the internal configuration of the one entity's terminal in the form of a schematic block configuration which is the extraction of functions related to speech processing. The parts in FIG. 3 having the same reference numbers as those in FIG. 1 and FIG. 2 have the same respective functions.

The configuration of the one entity's terminal is characterized in that a tone generator 20 as a reference signal generating means is provided at the electronic volume 3 for transmission with a select switch 21 (SW) interposed therebetween.

It is further characterized in that a reception level detecting portion 22 is provided between the speech CODEC communication control portion 2 and the control portion (CPU) 12.

The tone generator 20 generates a tone signal having a predetermined reference value, and is enabled to transmit the tone signal instead of a speech signal from the microphone 1 to the other entity terminals 23 and 24 through the network 6 by controlling the select switch 21 (SW).

Figure 5:
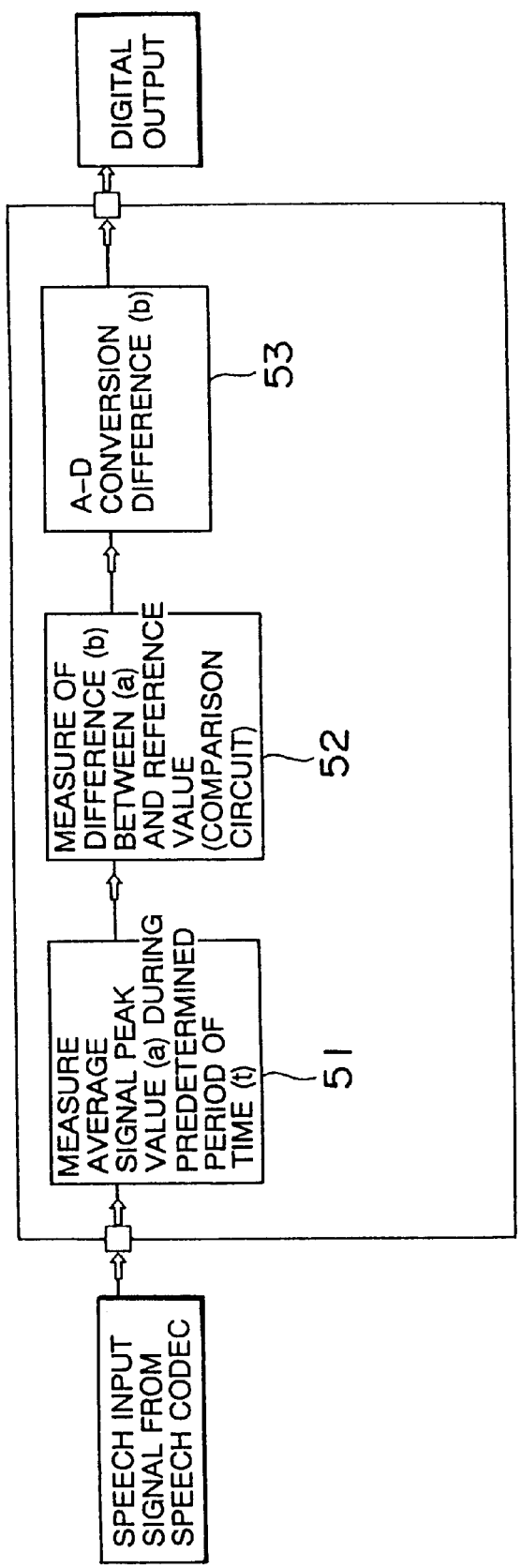
FIG. 5 is a block diagram showing the function of a reception level detecting portion.
Figure 6:
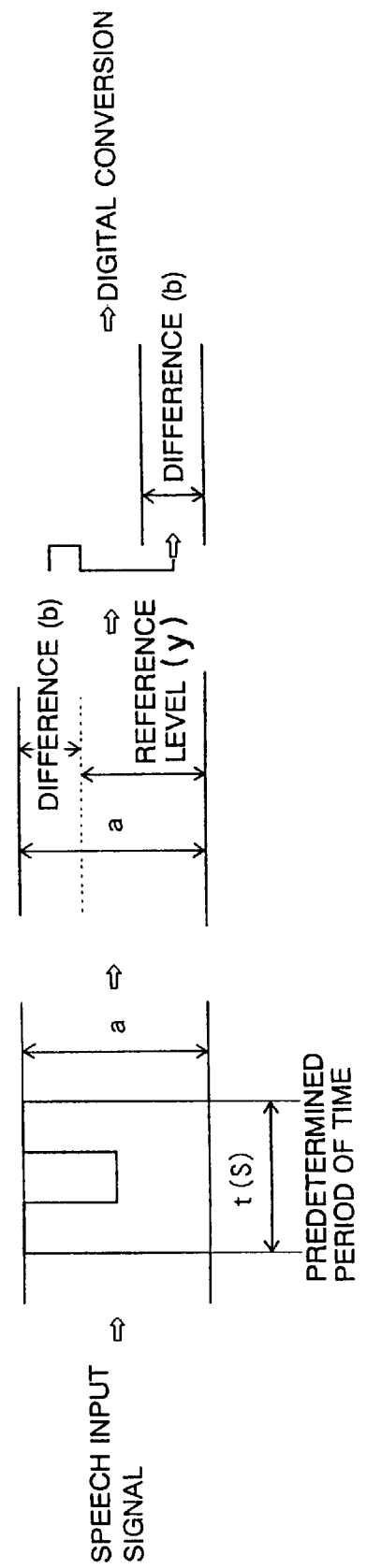
FIG. 6 graphically illustrates the principle of the calculation of a difference.

The reception level detecting portion 22 has a function of detecting the transmission levels of the other entity terminals 23 and 24 through detection of a signal which is a feedback of the above-described tone signal transmitted by the one entity's terminal and returned through the other entity terminals 23 and 24; i.e., a feedback tone signal and calculated differences between those transmission levels and the transmission level of the one entity's terminal (see FIGS. 5 and 6).

Figure 4:
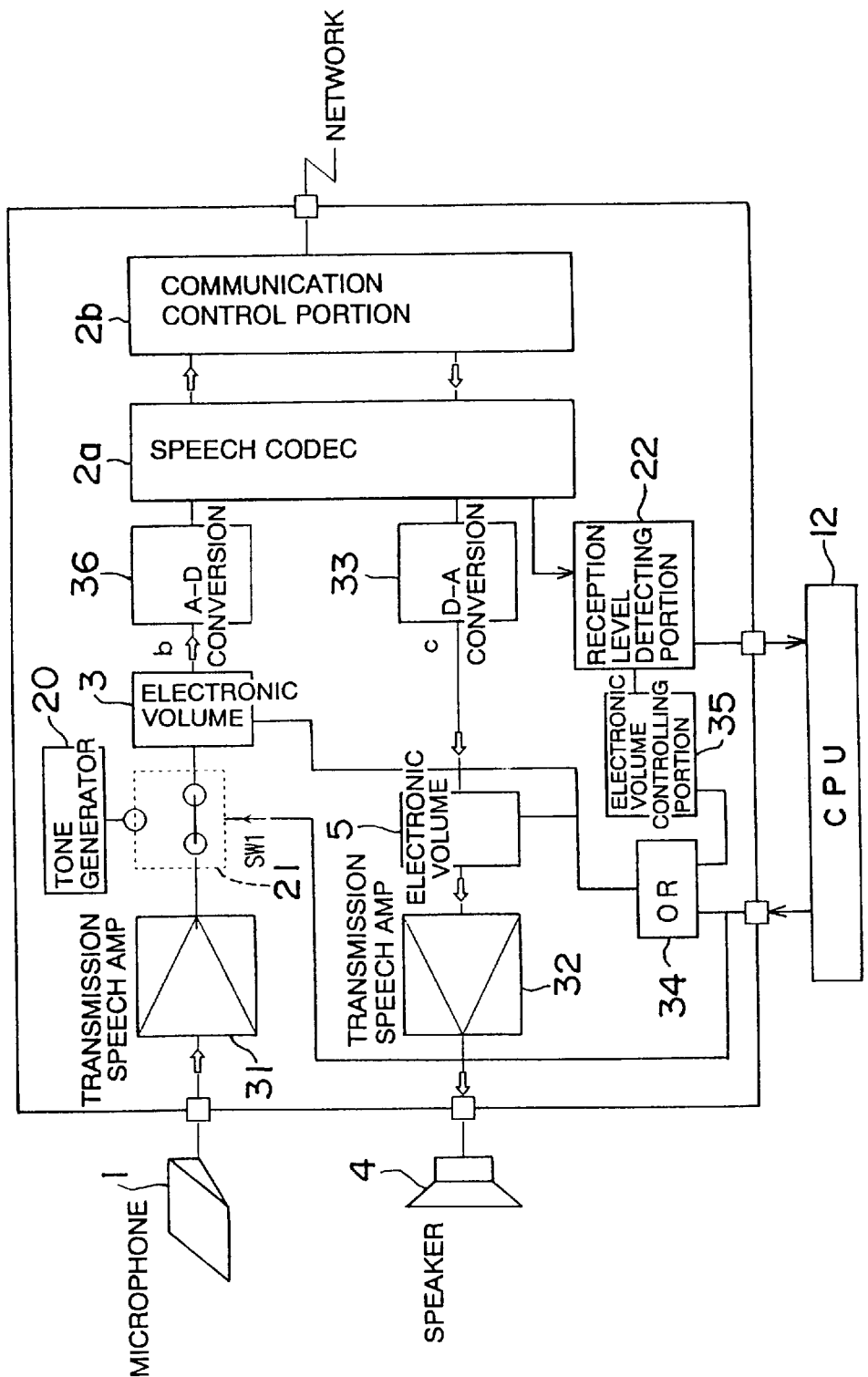
FIG. 4 is a block diagram showing internal functions of one entity's terminal of the second embodiment of the invention.

FIG. 4 shows the internal configuration of the one entity's terminal of this embodiment in more detail. The parts in FIG. 4 having the same reference numbers as those in FIG. 2 and FIG. 3 will not be described here because they have the same functions.

Referring to FIG. 4, a transmission speech amplifier 31 amplifies a speech input signal from the microphone 1 and outputs it to the switch 21. The switch 21 has a function of selecting either the input from the transmission speech amplifier 31 or the input from the tone generator 20 and outputting the selected signal to the electronic volume 3 for transmission. The operation of this switch 21 is controlled by the control portion 12 (CPU). The output of the electronic volume 3 for transmission is converted into a digital signal by an A-D conversion portion 36, and is thereafter transmitted to the network 6 through the speech CODEC 2a and the communication control portion 2b.

A D-A conversion portion 33 converts the digital speech signal received by the speech CODEC 2a into an analog signal which is in turn outputted to the electronic volume 5 for reception and the reception level detecting portion 22.

The speech signal whose volume level has been adjusted by the electronic volume 5 for reception is output from the speaker 4 through a reception speech amplifier 32.

The reception level detecting portion 22 receives the tone signal which has been fed back, measures an average signal peak value during a predetermined period of time (t) (51 in FIG. 5), and compares it with the reference output level of the one entity's terminal to calculate a difference (52). Then, it performs A-D conversion on the difference and passes the result on to an electronic volume controlling portion 35 as a control parameter. FIG. 6 conceptually illustrates the manner in which the difference is obtained.

The electronic volume controlling portion 35 controls the electronic volume 3 for transmission based on this parameter.

An OR circuit 34 is provided within the system for controlling the electronic volume 3 for transmission and the electronic volume 5 for reception to enable each of those volumes to be controlled by either a control signal from the control portion 12 (CPU) or a control signal from the electronic volume controlling portion 35.

Next, a description will be made of a training sequence executed before a television conference is started on the assumption that the above-described configuration is employed.

First, the speech CODEC 2a issues an analog loopback request to a terminal B (23) which is a partner for holding a television conference. In response to this request, the terminal B (23) controls the speech CODEC 2a to set its own circuit in a loopback mode.

Next, a control signal is sent from the control portion 12 (CPU) to the switch 21, and the switch 21 is switched so that output from the tone generator 20 is outputted to the electron volume 3 for transmission.

The tone signal (reference voice signal) outputted from the tone generator 20 is sent through the electronic volume 3 for transmission, and, after digital conversion at the A/D conversion portion 36, it is sent to the network 6 through the voice CODEC 2a and the communication control portion 2b. The tone signal is further delivered via the network 6 to the other entity's terminal B (23) of the counterpart with whom conversation is to occur. The tone signal is looped back at the other entity's terminal B (23) and is returned to the one entity's terminal once again via the network 6.

The tone signal received by the communication control portion 2b of the one entity's terminal has become a signal that conforms with the speech output level of the other entity's terminal B (23).

The reception level detecting portion 22 measures an average signal peak value (a) of the tone signal received by the speech CODEC 2a (reception tone signal) during a predetermined period of time (t) (FIGS. 5 and 6).

The difference (b) between the average signal peak value (a) and the reference level (y: reference speech signal) is calculated. Specifically, the reception tone signal looped back from the speech CODEC 2a has been output at the speech transmission level of the other entity's terminal B (23), and the difference between this level and the transmission level of the one entity's terminal can be calculated.

The difference (b) obtained as described above is subjected to A-D conversion at the reception level detecting portion 22, and is thereafter transmitted/communicated to the electronic volume controlling portion 35 as a control parameter.

Upon receipt of the control parameter as described above, the electronic volume controlling portion 35 controls the electronic volume 3 for transmission based on the value of this control parameter.

After effecting control over the electronic volume 3 for transmission, the control portion 12 (CPU) operates the switch 21 to output the output of the transmission speech amplifier 31 to the electronic volume 3 for transmission.

As described above, according to the present embodiment, a training sequence is executed using a tone signal to enable the one entity's terminal to set its own speech transmission level in conformity with the speech transmission level of another entity's terminal in communication, even if it does not have information concerning the transmission level of the counterpart terminal.

Figure 7:
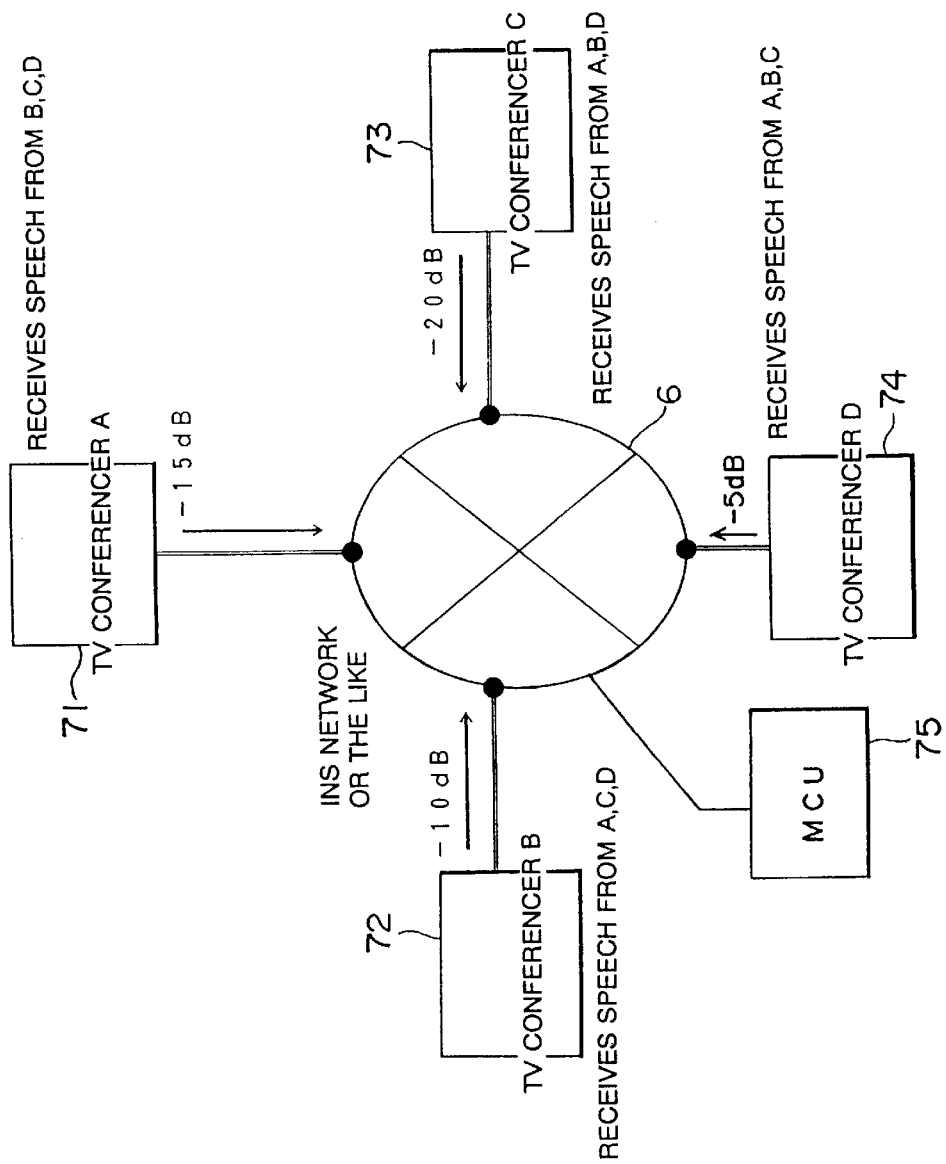
FIG. 7 shows a system configuration of a third embodiment of the present invention.

FIG. 7 shows a system configuration of a third embodiment of the present invention.

As shown in FIG. 7, the present embodiment is characterized in that a signal synthesis controller 75 (MCU: mixing control unit) is connected to the network 6 when a television conference is held between a multiplicity of locations—i.e., terminals 71, 72, 73, and 74—to adjust the speech transmission level between those terminals.

The internal configuration of the terminals 71 though 74 will not be described because it is substantially the same as that of the terminals 23 and 24 as described above with reference to FIG. 3.

That is, the present embodiment is characterized in that each terminal of the present embodiment does not include a mechanism for adjusting the transmission level, and all speech signals are delivered to each terminal after being subjected to level adjustment at the signal synthesis controller 75.

FIG. 8 shows an internal configuration of the signal synthesis controller 75 (which schematically shows only the speech processing portion). As shown in FIG. 8, a plurality of speech CODEC communication control portions 81 through 84 are provided as a communication interface. They are provided in the signal synthesis controller 75 in a quantity corresponding to the number of terminals which will participate in the television conference. The speech CODEC communication control portion 81 through 84 are respectively assigned to terminals connected during the television conference.

The speech CODEC communication control portions 81 through 84 respectively include level detection/conversion portions 91 through 94 which convert the levels of input speech signals and output speech signals. A speech mixing portion 104 performs input and output only at a reference level (−15 dB in this case).

Specifically, the level detection/conversion portions 91 through 94 have a function of converting various transmission levels from those terminals into the reference level (−15 dB) and inputting these signals to the speech mixing portion 104, and a function of converting a signal at the reference level (−15 dB) from the speech mixing portion 104 into a speech level in conformity with each terminal.

The tone generator 20 generates a tone signal which serves as a reference signal, and the transmission level of each of the terminals 71 through 74 can be detected by executing a training sequence using this tone signal.

The level detection/conversion portions 91 through 94 have an internal configuration consisting of a speech level detecting portion 101, an input digital speech level conversion portion 102, and an output digital speech level conversion portion 103. The function of the speech level detecting portion 101 will not be described here because it is the same as the function of the reception level detecting portion 22 described with reference to FIGS. 3 through 6.

During the training sequence executed prior to a television conference, the terminals 71 through 74 are set in a loopback mode in response to an analog loopback request from the speech CODEC communication control portions 81 through 84 to the terminals 71 through 74.

The tone generator 20 outputs the tone signal to the terminals 71 through 74, and feedback signals therefrom are received by the respective speech CODEC communication control portions 81 through 84. Then, the speech level detecting portions 101 compare the transmission levels of the respective terminals 81 through 84 with −15 dB, which is the reference level of the signal synthesis controller 75. The resultant differences are set in the input digital speech level conversion portions 102 and the output digital speech level conversion portions 103.

In the specific example shown in FIG. 8, when the speech level detecting portion 101 detects that the transmission level of the terminal 71 is −15 dB from the loopback of the tone signal, the transmission level is compared with the reference level (−15 dB). Since the difference is "0" in this case, "0" is set as a conversion value in the input digital speech level conversion portion 102 and in the output digital speech level conversion portion 103 of the level detection/conversion portion 91.

The level detection/conversion portion 92, which is assigned to operate on the terminal 72, detects that the transmission level of the terminal 72 is −10 dB from the loopback signal from the terminal 72. Then, it sets "−5 dB" in its own input digital speech level conversion portion (not shown) as a conversion value.

Meanwhile, +5 dB is set in the output digital speech level conversion portion (not shown) as a conversion value in order to adapt the reference level of −15 dB to −10 dB, which is the transmission level of the terminal 72.

Similarly, "+5 dB" is set as a conversion value in the input digital speech level conversion portion (not shown) of the level detection/conversion portion 92 assigned to the terminal 73 (−20 dB), and "−5 dB" is set as a conversion value in the output digital speech level conversion portion (not shown).

Further, "−10 dB" is set as a conversion value in the input digital speech level conversion portion (not shown) of the level detection/conversion portion 92 assigned to the terminal 74 (−5 dB), and "+10 dB" is set as a conversion value in the output digital speech level conversion portion (not shown).

After the television conference is started, the speech mixing portion 104 synthesizes the signal input from any one of the terminals having different transmission levels at −15 dB, which is the reference level.

When a speech synthesis signal is outputted from the signal synthesis controller 75 to each terminal, the signal is transmitted at a transmission level in conformity with the transmission level of the counterpart terminal. Therefore, a television conference can be held without causing a sense of disorder to the attendant at each terminal to whom voices from other terminals are delivered with the balance maintained therebetween.

According to the present invention, during television conferencing connecting a multiplicity of locations, volume levels from each terminal can be balanced without an awareness of the transmission level of the (counterpart) terminal with which connection is to be made, and discussion can occur without being affected by the magnitude of speech volume.

What is claimed is:

1. A speech input terminal connected to a multiplicity of terminals, comprising:

speech input means for inputting speech;

speech output means for outputting speech from another terminal among the multiplicity of terminals;

communication control means connected to both said speech input means and said speech output means for controlling communication with a communication line;

transmission volume adjusting means interposed between said speech input means and said communication control means for stepless adjustment of transmission volume;

reception volume adjusting means interposed between said communication control means and said speech output means; and volume difference calculating means for calculating a difference between a speech transmission volume of said another terminal and a speech transmission volume of said speech output means;

wherein said transmission volume adjustment means comprises a volume adjustment control means for controlling said transmission volume adjusting means using said difference as an adjustment amount.

2. The speech input terminal according to claim 1, wherein two or more said speech input means are provided; a selection means is provided between these speech input means and said transmission volume adjusting means; and said volume adjustment control means instructs said transmission volume adjusting means to output the speech from one of the speech input means selected by the selection means.

3. The speech input terminal according to claim 1, comprising:

a reference signal generation means interposed between said speech input means and said transmission volume adjusting means;

a reception level detecting means for detecting the reception level of a reception signal which has been output by said reference signal generation means and looped back from another terminal; and a volume adjustment control means for comparing the value of the reference signal of said reference signal generation means and the value detected by said reception level detecting means to detect the difference therebetween, and for controlling said transmission volume adjusting means and said reception volume adjusting means using said difference as a control amount.

4. The speech input terminal according to claim 1, wherein two or more of said speech input means are microphones, and the value of two or more adjustments which correspond to these microphones are registered in the storage means respectively.

5. The speech input terminal according to claim 1, wherein two or more said speech input means are other terminals connected via communication lines and the value of two or more adjustments which correspond to these terminals are registered in the storage means respectively.

6. A speech synthesizing terminal comprising:

a reference signal generation means connected to a plurality of speech input terminals for generating a reference signal to each of the speech input terminals;

a speech level detecting means for detecting the reference signal returned from each of the speech input terminals;

an input level conversion means for comparing the speech level detected by the speech level detecting means with an internal reference level and for performing level conversion using the difference therebetween as a correction amount;

a speech synthesizing means for synthesizing a speech signal from each of the speech input terminals at said internal reference level; and an output level conversion means for comparing speech output at the internal reference level from the speech synthesizing means with the speech level of each of the input terminals as described above, and for performing level conversion using the difference therebetween as a correction amount.

7. The voice synthesizing terminal according to claim 6, comprising a switching means for switching reference signal output with synthesized voice signal output in order to execute a training sequence for detecting the voice level of each voice input terminal by transmitting said reference signal prior to a conversation between each voice input terminal.

8. A signal synthesis controlling apparatus connected to a plurality of speech input terminals through a network, said apparatus comprising:

communicating means for receiving an input signal from each terminal among said speech input terminals and for transmitting an output signal to each terminal;

reference signal generating means for generating a reference signal;

level detecting means for detecting a difference between a level of the input signal and a level of the reference signal;

level converting means for converting the level of the input signal and a level of the output signal in accordance with said difference; and mixing means for mixing the input signal from said level converting means and for outputting the output signal to said communicating means through said level converting means.

9. A signal synthesis controlling apparatus according to claim 8, wherein said level detecting means detects said difference by looping back the reference signal at each terminal.

10. A signal synthesis controlling apparatus according to claim 9, wherein said communicating means, said level detecting means and said level converting means are provided for each speech input terminal.

11. A voice synthesizing method for television conference system comprising the steps of:

a requesting step for requesting by a terminal a television conference with another terminal;

a switching step for switching so that a tone signal is output from a tone generator for transmission via a network;

a returning step for returning the tone signal via the network;

a measuring step for measuring an average signal peak value (a) of the tone signal received from the another terminal during a predetermined period of time (t);

a calculating step for calculating a difference between the average signal peak value (a) and the reference level (y);

a controlling step for controlling the electronic volume for transmission based on the value of the calculation step; and a speech signal generating step for generating a speech signal according to the electronic volume of the controlling step.

* * * * *